(12) United States Patent
Kamimura et al.

(10) Patent No.: US 10,489,921 B2
(45) Date of Patent: Nov. 26, 2019

(54) BEHAVIOR ANALYSIS APPARATUS AND BEHAVIOR ANALYSIS METHOD

(71) Applicant: HITACHI, LTD., Tokyo (JP)

(72) Inventors: Toshio Kamimura, Tokyo (JP); Yuuichi Nonaka, Tokyo (JP); Akinobu Watanabe, Tokyo (JP); Yasuyuki Mimatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 20 days.

(21) Appl. No.: 15/473,875

(22) Filed: Mar. 30, 2017

(65) Prior Publication Data

US 2018/0144482 A1 May 24, 2018

(30) Foreign Application Priority Data

Nov. 24, 2016 (JP) .................................. 2016-227579

(51) Int. Cl.
  *G06T 7/20* (2017.01)
  *G06T 7/246* (2017.01)
  *G06K 9/00* (2006.01)

(52) U.S. Cl.
  CPC .......... *G06T 7/246* (2017.01); *G06K 9/00302* (2013.01); *G06T 2207/30196* (2013.01)

(58) Field of Classification Search
  CPC ................ G06T 7/246; G06T 2207/30196
  See application file for complete search history.

(56) References Cited

U.S. PATENT DOCUMENTS

| 2014/0098223 A1* | 4/2014 | Murata | G01B 11/026 |
| | | | 348/135 |
| 2016/0292880 A1* | 10/2016 | Kondo | G06F 17/30793 |
| 2017/0163879 A1* | 6/2017 | Tsuji | H04N 5/23216 |

FOREIGN PATENT DOCUMENTS

| CN | 105184274 | * | 9/2015 |
| JP | 09-251542 A | | 9/1997 |
| JP | 2009-100454 | * | 5/2009 |
| JP | 2017-121042 | * | 12/2015 |

OTHER PUBLICATIONS

Machine translation for JP2017-121042.*
Machine translation for CN 105184274 (Year: 2015).*
Machine translation for JP 2009-100454, Fujii (Year: 2009).*

* cited by examiner

*Primary Examiner* — Qian Yang
(74) *Attorney, Agent, or Firm* — Mattingly & Malur, PC

(57) ABSTRACT

Provided is a technology for preventing a frame-out of a person from an image acquired through a camera in a behavior analysis technology using the acquired image. A behavior analysis apparatus includes: an image acquisition unit; a person image extraction unit; a person skeleton detection unit; a person behavior analysis unit; a frame-out determination unit configured to determine a frame-out of the person toward an outside of the predetermined field angle as to one of whether or not the frame-out has occurred and whether or not the frame-out is predictable through use of any one of the person image area and the person skeleton; and a frame-out notification unit configured to notify the person of the determination in one of a case where the frame-out has occurred and a case where the frame-out is predictable.

18 Claims, 9 Drawing Sheets

| PROCESSING ITEM | PROCESSING CONTENT |
|---|---|
| FRAME-OUT DETERMINATION | DETERMINE THAT FRAME-OUT HAS OCCURRED WHEN PERSON IMAGE EXISTS IN PIXEL OF OUTERMOST PERIPHERY OF PHOTOGRAPHED IMAGE |
| FRAME-OUT NOTIFICATION | ISSUE SOUND NOTIFICATION WITH MESSAGE "YOU HAVE BEEN FRAMED OUT TO THE LEFT, SO MOVE BACK TO THE NORMAL POSITION IMMEDIATELY." |

FIG. 5
| PROCESSING ITEM | PROCESSING CONTENT |
|---|---|
| FRAME-OUT DETERMINATION | DETERMINE THAT FRAME-OUT IS PREDICTABLE WHEN PERSON IMAGE EXISTS IN PIXEL SPACED APART FROM OUTERMOST PERIPHERY OF PHOTOGRAPHED IMAGE BY PREDETERMINED DISTANCE |
| FRAME-OUT NOTIFICATION | ISSUE SOUND NOTIFICATION WITH MESSAGE "YOU WILL BE FRAMED OUT TO THE LEFT, SO BE AWARE OF THE NORMAL POSITION." |
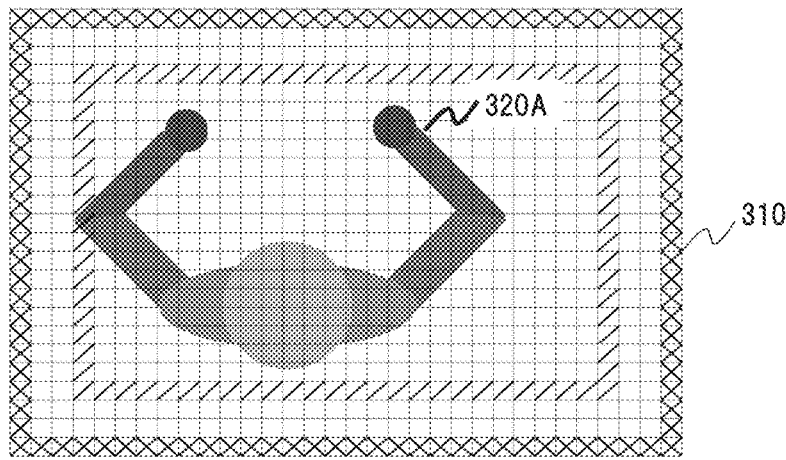
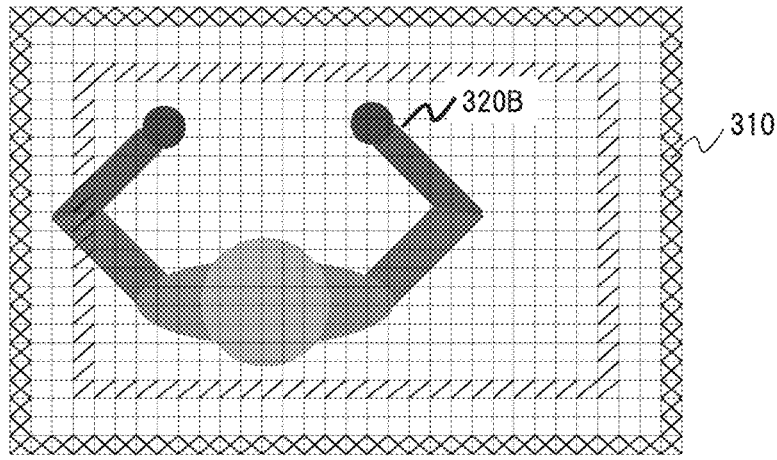

FIG. 6

| PROCESSING ITEM | PROCESSING CONTENT |
|---|---|
| FRAME-OUT DETERMINATION | DETERMINE THAT FRAME-OUT IS PREDICTABLE WHEN CENTROID OF PERSON IMAGE DOES NOT EXIST IN CENTER AREA HAVING 8 PIXELS IN HORIZONTAL DIRECTION AND 6 PIXELS IN VERTICAL DIRECTION |
| FRAME-OUT NOTIFICATION | ISSUE SOUND NOTIFICATION WITH MESSAGE "YOU WILL BE FRAMED OUT TO THE LEFT, SO BE AWARE OF THE NORMAL POSITION." |

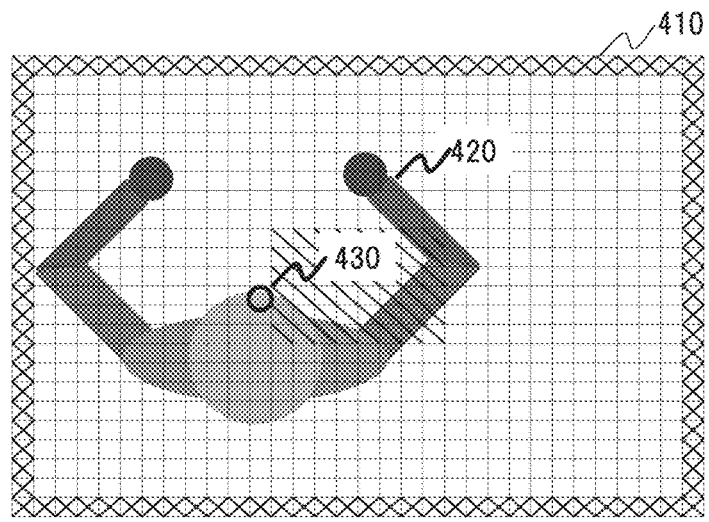

| PROCESSING ITEM | PROCESSING CONTENT |
|---|---|
| FRAME-OUT DETERMINATION | DETERMINE THAT FRAME-OUT HAS OCCURRED WHEN PERSON SKELETON EXISTS IN PIXEL OF OUTERMOST PERIPHERY OF PHOTOGRAPHED IMAGE |
| FRAME-OUT NOTIFICATION | ISSUE DISPLAY NOTIFICATION WITH MESSAGE "YOU HAVE BEEN FRAMED OUT TO THE LEFT, SO MOVE BACK TO THE NORMAL POSITION IMMEDIATELY." |

FIG. 8

| PROCESSING ITEM | PROCESSING CONTENT |
|---|---|
| FRAME-OUT DETERMINATION | DETERMINE THAT FRAME-OUT IS PREDICTABLE WHEN PERSON SKELETON EXISTS IN PIXEL SPACED APART FROM OUTERMOST PERIPHERY OF PHOTOGRAPHED IMAGE BY PREDETERMINED DISTANCE |
| FRAME-OUT NOTIFICATION | ISSUE DISPLAY NOTIFICATION WITH MESSAGE "YOU WILL BE FRAMED OUT TO THE LEFT, SO BE AWARE OF THE NORMAL POSITION." |

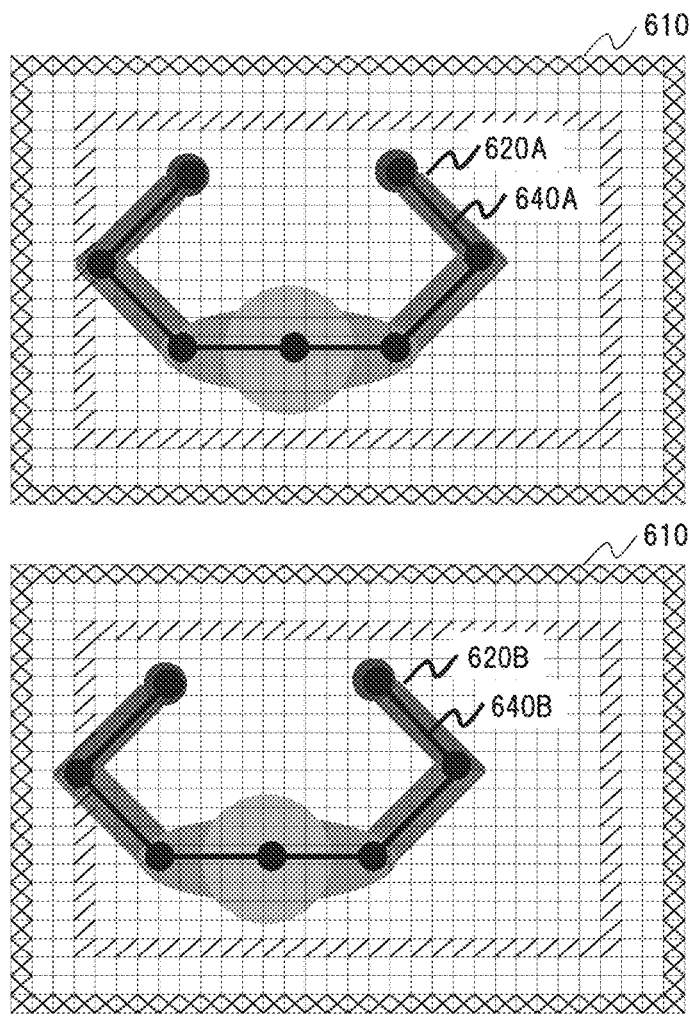

FIG. 9

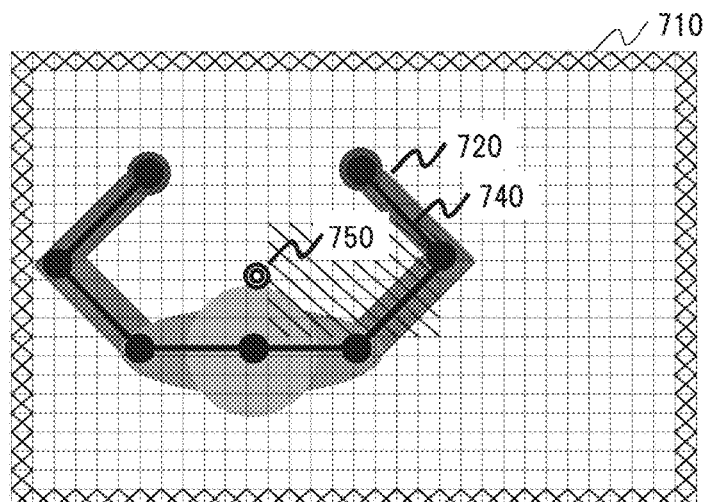

| PROCESSING ITEM | PROCESSING CONTENT |
| --- | --- |
| FRAME-OUT DETERMINATION | DETERMINE THAT FRAME-OUT IS PREDICTABLE WHEN CENTROID OF PERSON SKELETON DOES NOT EXIST IN CENTER AREA HAVING 8 PIXELS IN HORIZONTAL DIRECTION AND 6 PIXELS IN VERTICAL DIRECTION |
| FRAME-OUT NOTIFICATION | ISSUE DISPLAY NOTIFICATION WITH MESSAGE "YOU WILL BE FRAMED OUT TO THE LEFT, SO BE AWARE OF THE NORMAL POSITION." |

BEHAVIOR ANALYSIS APPARATUS AND BEHAVIOR ANALYSIS METHOD

INCORPORATION BY REFERENCE

This application claims the priority based on a Japanese Patent Application No. 2016-227579 filed on Nov. 24, 2016, the entire contents of which are incorporated herein by reference for all purpose.

BACKGROUND OF THE INVENTION

The present invention relates to a behavior analysis apparatus and a behavior analysis method.

The background art in the technical field of the present invention includes Japanese Patent Laid-open Publication No. H09-251542. In Japanese Patent Laid-open Publication No. H09-251542, paragraph [0005] includes the description " . . . the present invention provides a person motion analysis method of automatically grasping a position state, a motion state, and the like of an operating person to enable user-friendly guidance of an operation method and warning of an error to be conducted based on the position state, the motion state, and the like of the operating person.", and paragraph [0009] includes the description "includes: . . . image input means for continuously inputting an image including the upper body of a person who is operating a device configured to successively conducting predetermined processing formed of a plurality of steps through the person's operation; . . . analysis means for analyzing a position state and a motion state of an operating person; processing error detecting means for detecting, from an analysis result obtained by the analysis means and the actual processing state obtained from the device, that the operating person has conducted a processing operation different from a normal processing procedure and has left without noticing the fact; guidance means for informing the person that the processing is incomplete when the processing error detecting means detects that the person has left; and control means for detecting a direction in which the person has left and a direction in which the person approaches again when the processing error detecting means detects that the person has left, determining whether or not the approaching person is identical to the person who has left through comparison between the two directions, and controlling the guidance means to conduct guidance based on a result of the determination."

SUMMARY OF THE INVENTION

The above-mentioned technology disclosed in Japanese Patent Laid-open Publication No. H09-251542 is expected to conduct the warning of an operation error on social system devices including an automated teller machine and a ticket machine based on the state of the operating person which is analyzed from a camera image or the like and the operation content. However, in the technology disclosed in Japanese Patent Laid-open Publication No. H09-251542, in regard to a behavior analysis apparatus or the like for a worker on a manufacturing site or the like, it is not taken into consideration to prevent an occurrence of a frame-out of a person from an acquired image under an environment involving restrictions for installing a camera. Therefore, there is a fear that the accuracy in personal posture detection or behavior analysis may deteriorate due to an occurrence of a frame-out of a subject person from the image acquired through a camera.

The present invention has an object to provide a technology for preventing a frame-out of a person from an image acquired through a camera in a behavior analysis technology using the acquired image.

The present application includes a plurality of measures for solving at least a part of the problem, and a description is now given of an example thereof. In order to solve the above-mentioned problem, according to one embodiment of the present invention, there is provided a behavior analysis apparatus, including: an image acquisition unit configured to acquire a photographed image including a person with a predetermined field angle; a person image extraction unit configured to extract an area in which the person being a moving subject exists from the photographed image as a person image area; a person skeleton detection unit configured to detect a person skeleton from the person image area; a person behavior analysis unit configured to analyze a behavior of the person from the person skeleton; a frame-out determination unit configured to determine a frame-out of the person toward an outside of the predetermined field angle as to one of whether or not the frame-out has occurred and whether or not the frame-out is predictable through use of any one of the person image area and the person skeleton; and a frame-out notification unit configured to notify the person of the determination in one of a case where the frame-out has occurred and a case where the frame-out is predictable.

According to the present invention, it is possible to provide the technology for preventing a frame-out of the person from an image acquired through a camera in the behavior analysis technology using the image acquired through the camera. Other objects, configurations, and effects other than those described above become more apparent from the following description of an embodiment of the present invention.

BRIEF DESCRIPTION OF THE DRAWINGS

FIG. 5 is a diagram for illustrating an example of determining whether or not the frame-out of the person image is predictable in the behavior analysis apparatus according to the first embodiment.

FIG. 6 is a diagram for illustrating another example of determining whether or not the frame-out of the person image is predictable in the behavior analysis apparatus according to the first embodiment.

FIG. 8 is a diagram for illustrating an example of determining whether or not the frame-out of the person skeleton is predictable in the behavior analysis apparatus according to the first embodiment.

FIG. 9 is a diagram for illustrating another example of determining whether or not the frame-out of the person skeleton is predictable in the behavior analysis apparatus according to the first embodiment.

DESCRIPTION OF THE PREFERRED EMBODIMENTS

Figure 1:
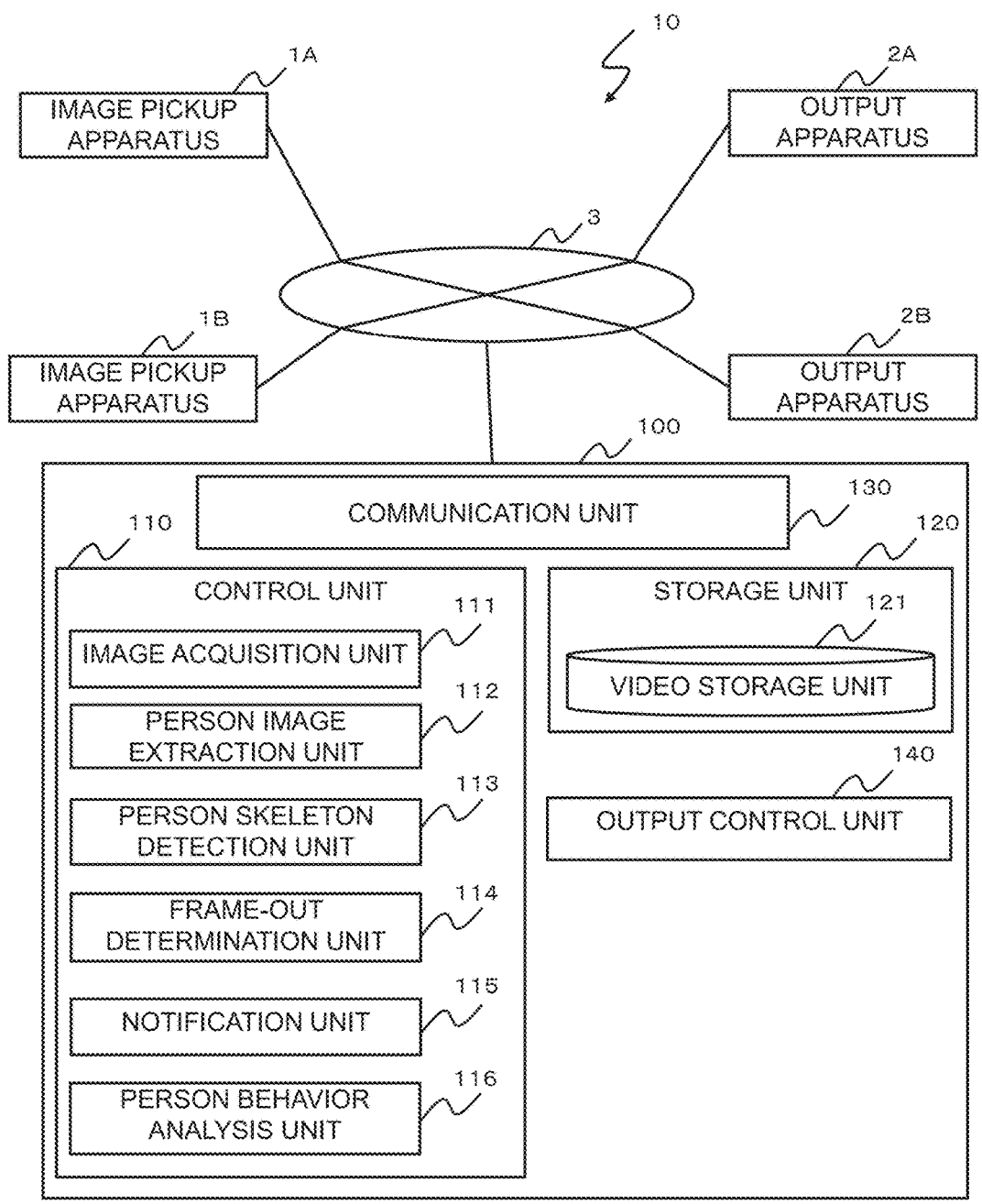
FIG. 1 is a diagram for illustrating a configuration of a behavior analysis system according to a first embodiment of the present invention.

One embodiment of the present invention is now described with reference to the drawings. In all the drawings for illustrating the embodiment, the same parts are denoted by the same reference numeral or symbol as a rule, and overlapping description thereof is omitted. It should be understood that, in the following description of the embodiment of the present invention, a component (including a constituent step) is not always indispensable unless explicitly noted otherwise or unless it is theoretically obvious that the component is indispensable. Further, it should be understood that when a description "formed of A", "formed by A", "having A", or "including A" is given, those descriptions do not exclude other components unless it is explicitly stated that a certain component includes only that component in particular. Similarly, when the shapes, positional relations, and the like of components are mentioned in the following description of the embodiment of the present invention, shapes and the like that are substantially approximate to or similar to the ones mentioned are included unless explicitly noted otherwise or unless it is theoretically obvious that it is not the case.

In general, an apparatus configured to analyze a behavior of a worker on a manufacturing site through use of a camera has various restrictions in installing a camera in terms of cost performance. The restrictions may include, for example, points that: (1) the number of installed cameras is set to 1 (item/person) in order to reduce an installation cost; (2) the camera is set to face vertically downward in order to ensure such a degree of freedom of the installation position as to avoid including an image of equipment on site or the like; (3) the camera may be located at a height of about 2.5 (m) because the camera can only be installed at a position lower than a ceiling on site; and (4) a low-end camera having a viewing angle of about 70 degrees is often employed in order to reduce a camera cost.

In some cases, a clearance for causing the entirety of a worker who is moving while working within a camera visual field to stay on a video is small due to such restrictions for installing a camera, and even during normal work, a frame-out of the person from a camera field angle may occur due to a small displacement in working position of the worker or motion of his or her arm.

FIG. 1 is a diagram for illustrating a configuration of a behavior analysis system according to a first embodiment of the present invention. A behavior analysis system 10 includes an image pickup apparatus 1A and an image pickup apparatus 1B (hereinafter referred to as "image pickup apparatus 1" unless the image pickup apparatus 1A and the image pickup apparatus 1B are particularly distinguished from each other), an output apparatus 2A and an output apparatus 2B (hereinafter referred to as "output apparatus 2" unless the output apparatus 2A and the output apparatus 2B are particularly distinguished from each other), and a behavior analysis apparatus 100.

The image pickup apparatus 1, the output apparatus 2, and the behavior analysis apparatus 100 are communicably connected to one another through a network 3, and the behavior analysis apparatus 100 can communicate to/from each of the image pickup apparatus 1 and the output apparatus 2. The numbers of the image pickup apparatus 1 and the output apparatus 2 are each two in FIG. 1, but the present invention is not limited thereto. Each of the numbers may be one or larger than two.

Examples of the network 3 include the Internet or other such public network, a local area network (LAN), and a wide area network (WAN). The network 3 may be another general communication means including a universal serial bus (USB) or a high-definition multimedia interface (HDMI).

The image pickup apparatus 1 is a range image camera, a stereo camera, or the like, and is configured to acquire a photographed image desirably including information on a depth (distance from a subject) for each pixel. The image pickup apparatus 1 is further configured to transmit the acquired photographed image to the behavior analysis apparatus 100.

The output apparatus 2 is a display apparatus assigned to each worker, a headset having a display function, or a non-display apparatus, for example, a plurality of lamps arranged so that front/back/left/right directions are distinguishable or a speaker configured to output sound. The output apparatus 2 is configured to conduct output after receiving an output instruction from the behavior analysis apparatus 100. When the output instruction is a sound output instruction, the output apparatus 2 outputs sound from the display apparatus, the headset, or the speaker. When the output instruction is a display output instruction, the output apparatus 2 outputs visual information from the display apparatus or the headset. When the output instruction is a lighting instruction for the lamps, the output apparatus 2 displays the lamps so as to indicate a direction corresponding to the lighting instruction.

Examples of the behavior analysis apparatus 100 include a server computer being physical computer hardware. The behavior analysis apparatus 100 is communicably connected to the image pickup apparatus 1 and the output apparatus 2, and can acquire the photographed image from the image pickup apparatus 1 and transmit output information to the output apparatus 2.

The behavior analysis apparatus 100 includes a control unit 110, a storage unit 120, a communication unit 130, and an output control unit 140. The control unit 110 includes an image acquisition unit 111, a person image extraction unit 112, a person skeleton detection unit 113, a frame-out determination unit 114, a notification unit 115, and a person behavior analysis unit 116. The storage unit 120 includes a video storage unit 121 configured to store a moving image formed of a plurality of still images having a predetermined data structure.

The image acquisition unit 111 is configured to acquire a photographed image including a person, for example, a worker, with a predetermined field angle. Specifically, the image acquisition unit 111 receives the photographed image from the image pickup apparatus 1, to thereby acquire the photographed image. However, the present invention is not limited thereto, and the image acquisition unit 111 may be configured to acquire the moving image in a stream format from another server apparatus or the like through a network.

The person image extraction unit 112 is configured to extract an area in which the person being a moving subject exists from the photographed image as a person image area in distinction from a background.

The person skeleton detection unit 113 is configured to detect a person skeleton representing a posture of the person through use of a person image.

The frame-out determination unit 114 is configured to determine a frame-out of the person toward the outside of the predetermined field angle as to whether or not the frame-out has occurred or whether or not the frame-out is predictable through use of any one or both of the person image area and the person skeleton.

The notification unit 115 is configured to output predetermined display or sound for warning or alert in order to notify the person, for example, the worker, of information on the frame-out or the prediction when the frame-out has occurred or is predictable.

The person behavior analysis unit 116 is configured to analyze the behavior of the person through use of the person skeleton.

The image acquisition unit 111, the person image extraction unit 112, the person skeleton detection unit 113, and the person behavior analysis unit 116 are processing units each having a known technical feature without having a processing feature unique to this embodiment, and hence a detailed description of the processing of each of the processing units is omitted. In brief outline, the image acquisition unit 111 is formed of a range image camera or a stereo camera, and is configured to acquire a range image. The person image extraction unit 112 is formed of moving subject extraction means for the temporal transition of the range image, and is configured to acquire the person image. The person skeleton detection unit 113 is formed of machine learning means for the range image of the person, and is configured to detect a skeleton of the person. The person behavior analysis unit 116 is formed of machine learning means for the temporal transition of the person skeleton, and is configured to analyze the behavior of the person.

Further, the video storage unit 121 is configured to store and manage, in a predetermined file format, for example, a moving image whose reproducing order of a plurality of still images is determined based on the temporal transition or another moving image recorded in interlace or other such predetermined format.

The communication unit 130 is configured to communicate digital data to/from each of the image pickup apparatus 1 and the output apparatus 2 through the network 3.

The output control unit 140 is configured to control the output apparatus 2 to conduct the output based on the kind of output (one or both of display and sound).

As described above, in this embodiment, the image pickup apparatus 1, the output apparatus 2, and the behavior analysis apparatus 100 are configured as different independent apparatus, but it should be understood that the functions of the respective apparatus may be implemented on a computer being one physical computer hardware component.

Figure 2:
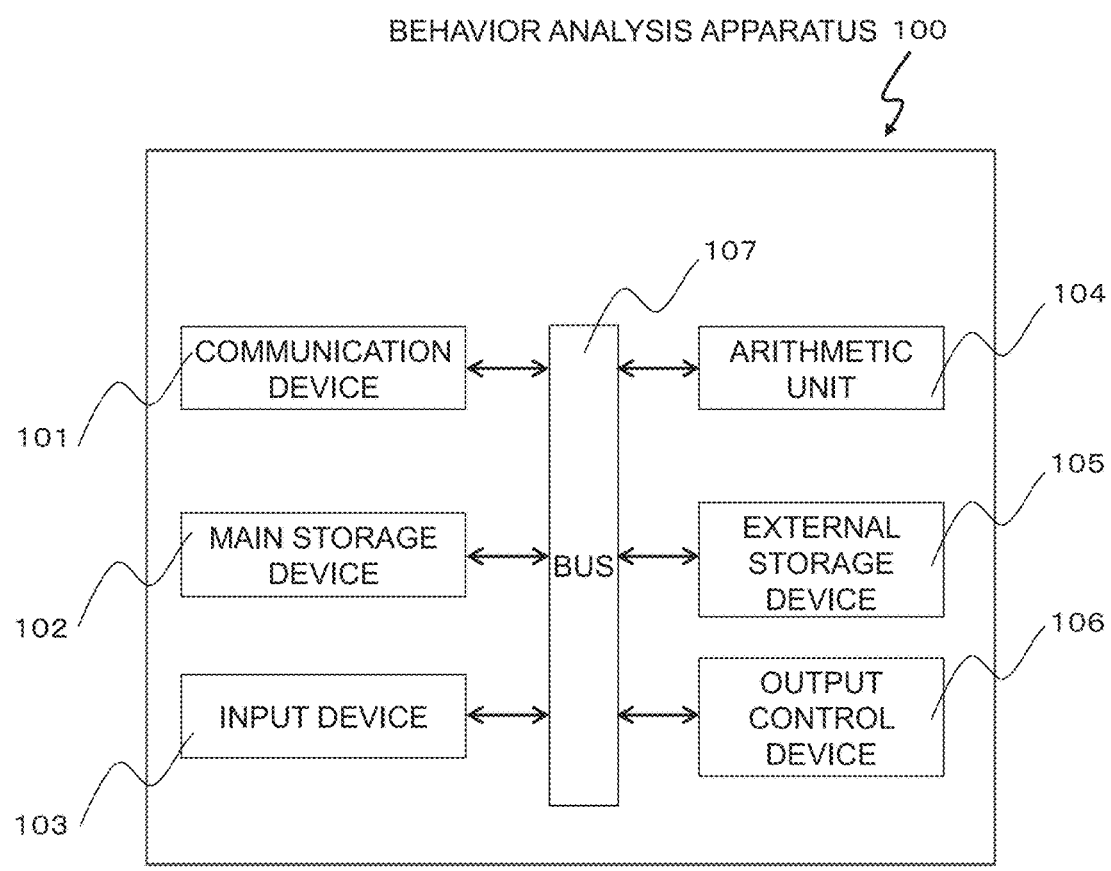
FIG. 2 is a diagram for illustrating a hardware configuration of a behavior analysis apparatus according to the first embodiment.

FIG. 2 is a diagram for illustrating a hardware configuration of the behavior analysis apparatus 100. The behavior analysis apparatus 100 includes: a communication device 101, for example, a network interface card (NIC); a main storage device 102, for example, a memory; an input device 103, for example, a keyboard or a mouse; an arithmetic unit 104, for example, a central processing unit (CPU); an external storage device 105, for example, a hard disk drive or a solid state drive (SSD); an output control device 106 configured to control the output to the display, the speaker, or the like; and a bus 107 configured to connect those devices to one another.

The communication device 101 is a wired communication device configured to conduct wired communications through a network cable or a wireless communication device configured to conduct wireless communications through an antenna. The communication device 101 is configured to conduct communications to/from another apparatus connected to the network 3.

The main storage device 102 is a memory, for example, a random access memory (RAM).

The input device 103 is a device configured to receive input information, and examples thereof include a keyboard, a mouse or other such pointing device, a touch panel, and a microphone being a voice input device.

The external storage device 105 is a so-called nonvolatile storage device, for example, a hard disk drive, an SSD, or a flash memory, which is capable of storing digital information.

The image acquisition unit 111, the person image extraction unit 112, the person skeleton detection unit 113, the frame-out determination unit 114, the notification unit 115, and the person behavior analysis unit 116 that are described above are implemented by programs for causing the arithmetic unit 104 to conduct processing. The programs are stored in the main storage device 102 or the external storage device 105, and at a time of execution, loaded onto the main storage device 102 to be executed by the arithmetic unit 104.

A table stored in the storage unit 120 is implemented by the main storage device 102 and the external storage device 105.

The communication unit 130 communicably connected to the Internet, a LAN, or the like is implemented by the communication device 101. The output control unit 140 is implemented by the output control device 106.

An example of the hardware configuration of the behavior analysis apparatus 100 according to this embodiment has been described above. However, the present invention is not limited thereto, and the behavior analysis apparatus 100 may be configured through use of another piece of hardware. For example, the behavior analysis apparatus 100 may be an apparatus configured to distributively conduct arithmetic operation processing through the Internet.

Although not shown, the behavior analysis apparatus 100 includes an operating system (OS), middleware, an application, and other such known components, and more particularly, has an existing processing function for displaying a GUI screen on an input/output device, for example, a display.

[Descriptions of Operation]

Next, a description is made of an operation of the behavior analysis apparatus 100 according to this embodiment.

Figure 3:
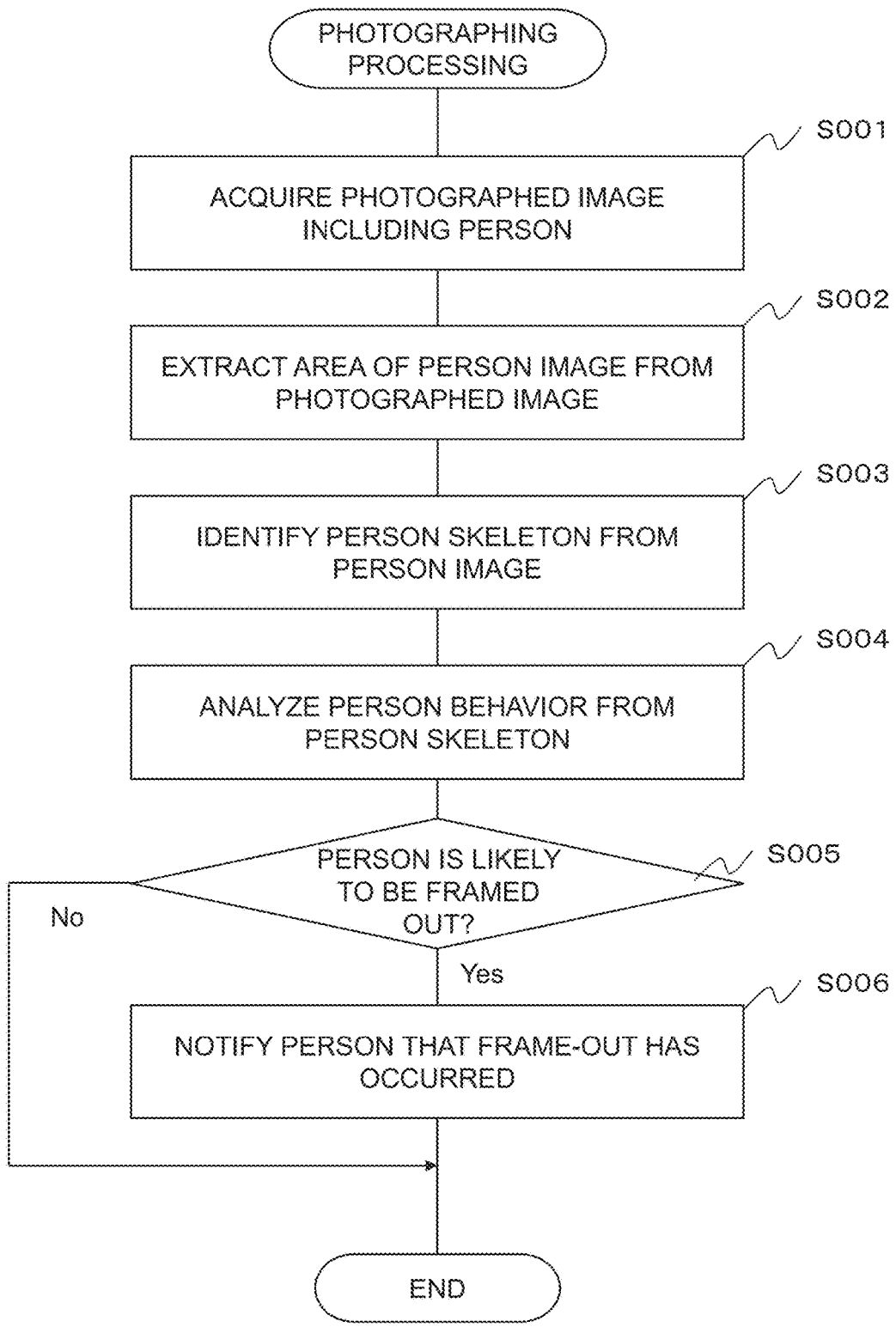
FIG. 3 is a diagram for illustrating an operation flow of photographing processing.

FIG. 3 is a diagram for illustrating an operation flow of photographing processing. The photographing processing is processing for conducting, by the behavior analysis apparatus 100, predetermined image processing based on the photographed image, and when the frame-out of the subject has occurred or is predictable, issuing an alert to prompt the subject to, for example, move to another position. The photographing processing is started every predetermined time (for example, every five seconds), and is conducted for the photographed image acquired within the previous time (for example, five seconds).

First, the image acquisition unit 111 acquires a photographed image including a person (Step S001).

Then, the person image extraction unit 112 extracts an area of a person image from the photographed image (Step S002).

Then, the person skeleton detection unit 113 identifies a person skeleton from the person image (Step S003).

Then, the person behavior analysis unit 116 analyzes a behavior of the person from the person skeleton (Step S004).

Subsequently, the frame-out determination unit 114 determines whether or not there is a fear that the person may be framed out (Step S005). When there is no fear of the frame-out (when "No" in Step S005), the frame-out determination unit 114 brings the photographing processing to an end.

When there is a fear of the frame-out (when "Yes" in Step S005), the notification unit 115 notifies the person of a direction of the frame-out and the fact that the frame-out has occurred (Step S006). Then, the notification unit 115 brings the photographing processing to an end.

The operation flow of the photographing processing has been described. According to the photographing processing, the frame-out of the person from the acquired image can be prevented in a behavior analysis technology using the image acquired through the camera.

In Step S005 of the photographing processing described above, the frame-out determination unit 114 determines the fear of the frame-out of the person, and some Examples can be assumed for the above-mentioned determination. The Examples are described below, but the present invention is not limited thereto, and it should be understood that another Example may be employed.

Figure 4:
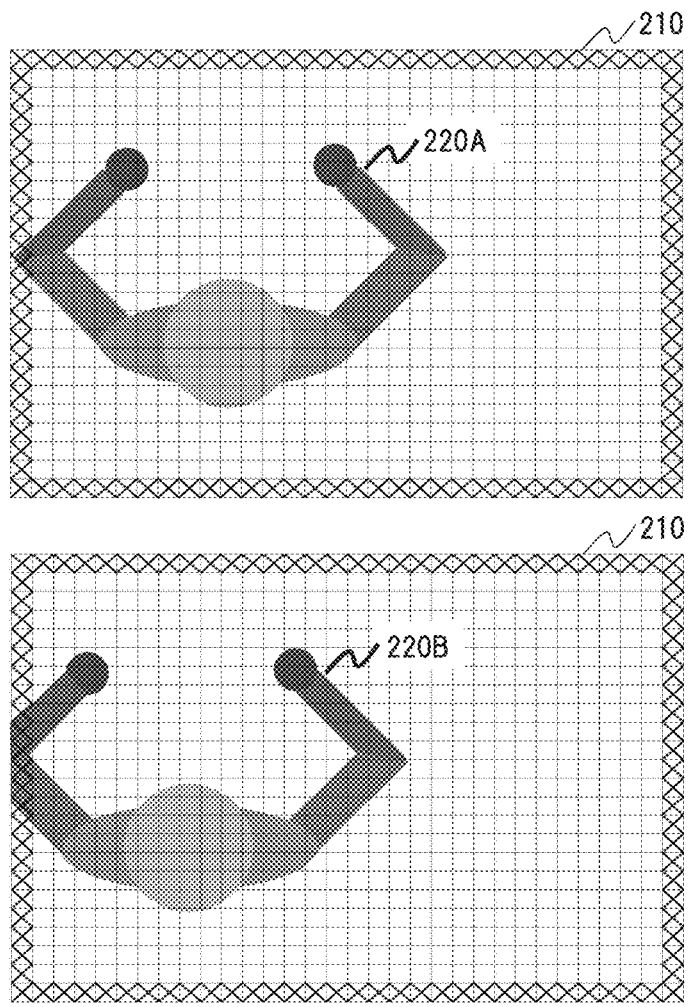
FIG. 4 is a diagram for illustrating an example of determining an occurrence of a frame-out of a person image in the behavior analysis apparatus according to the first embodiment.

FIG. 4 is a diagram for illustrating an example of determining an occurrence of the frame-out of the person image in the behavior analysis apparatus 100 according to the first embodiment. In the determination of the occurrence of the frame-out of the person image in the behavior analysis apparatus 100 according to the first embodiment, as a processing content of the determination of the frame-out, the frame-out determination unit 114 determines that the frame-out has occurred when the person image exists in a pixel of the outermost periphery of a photographed image 210. In this case, the notification unit 115 notifies the person of the direction of the frame-out, the fact that the frame-out has occurred, and a behavior for improvement based on a direction in which the pixel involved in the detection of the frame-out is arranged with respect to the picked-up image with the message "You have been framed out to the left, so move back to the normal position immediately."

In the example of FIG. 4, the photographed image 210 is obtained by arranging 32 pixels in the horizontal direction and 24 pixels in the vertical direction, each of the pixels being indicated by a square. A pixel indicated by the mark "x" represents a pixel that falls in the outermost periphery of the photographed image 210. Person images 220A and 220B are obtained by extracting the person image from the photographed image viewed from immediately above the person, and are assumed to have a color density that simulates a distance (depth) from the photographing position. It is apparent that the number of pixels within the photographed image 210 is not limited to 32 pixels in the horizontal direction or 24 pixels in the vertical direction. For example, the photographed image 210 may have 640 pixels in the horizontal direction and 480 pixels in the vertical direction.

In FIG. 4, the person's left elbow is included in the pixels of the outermost periphery within both the person image 220A and the person image 220B, and hence it is determined that the person image exists in the pixels of the outermost periphery and that the frame-out has occurred.

FIG. 5 is a diagram for illustrating an example of determining whether or not the frame-out of the person image is predictable in the behavior analysis apparatus 100 according to the first embodiment. In the determination as to whether or not the frame-out of the person image is predictable in the behavior analysis apparatus 100 according to the first embodiment, as a processing content of the determination of the frame-out, the frame-out determination unit 114 determines that the frame-out is predictable when the person image exists in a pixel spaced apart from the outermost periphery of a photographed image 310 by a predetermined distance. In this case, the notification unit 115 notifies the person of the direction of the frame-out, the prediction of the frame-out, and the behavior for improvement based on a direction in which the pixel involved in the detection of the predictable frame-out is arranged with respect to the picked-up image with the message "You will be framed out to the left, so be aware of the normal position."

In the example of FIG. 5, the photographed image 310 is obtained by arranging 32 pixels in the horizontal direction and 24 pixels in the vertical direction, each of the pixels being indicated by a square. A pixel indicated by the mark "x" represents the pixel that corresponds to the outermost periphery of the photographed image 310. A pixel indicated by the oblique line represents a pixel spaced apart from the outermost periphery of the photographed image 310 toward the inside by the predetermined distance. Person images 320A and 320B are obtained by extracting the person image from the photographed image viewed from immediately above the person, and are assumed to have a color density that simulates a distance (depth) from the photographing position. It is apparent that the number of pixels within the photographed image 310 is not limited to 32 pixels in the horizontal direction or 24 pixels in the vertical direction. For example, the photographed image 310 may have 640 pixels in the horizontal direction and 480 pixels in the vertical direction.

In FIG. 5, the person's left elbow is included in the pixels spaced apart from the outermost periphery toward the inside by the predetermined distance within both the person image 320A and the person image 320B, and hence it is determined that the person image exists in the pixel spaced apart from the outermost periphery toward the inside by the predetermined distance and that the occurrence of the frame-out is predictable.

FIG. 6 is a diagram for illustrating another example of determining whether or not the frame-out of the person image is predictable in the behavior analysis apparatus 100 according to the first embodiment. In the another example of determining whether or not the frame-out of the person image is predictable in the behavior analysis apparatus 100 according to the first embodiment, as a processing content of the determination of the frame-out, the frame-out determination unit 114 determines that the frame-out is predictable when a centroid 430 of the person image does not exist in pixels within a predetermined area near the center of a photographed image 410 (for example, within a rectangular shape having 8 pixels in the horizontal direction and 6 pixels in the vertical direction with a center pixel of the photographed image 410 being used as the center). In this case, the notification unit 115 notifies the person of the direction of the frame-out, the prediction of the frame-out, and the behavior for improvement based on the direction in which the pixel involved in the detection of the predictable frame-out is arranged with respect to the picked-up image with the message "You will be framed out to the left, so be aware of the normal position."

In the example of FIG. 6, the photographed image 410 is obtained by arranging 32 pixels in the horizontal direction and 24 pixels in the vertical direction, each of the pixels being indicated by a square. A pixel indicated by the mark "x" represents a pixel that corresponds to the outermost periphery of the photographed image 410. A pixel indicated by the oblique line represents a pixel existing in the predetermined area near the center of the photographed image 410. A person image 420 is obtained by extracting the person image from the photographed image viewed from immediately above the person, and is assumed to have a color density that simulates a distance (depth) from the photographing position. It is apparent that the number of pixels within the photographed image 410 is not limited to 32 pixels in the horizontal direction or 24 pixels in the vertical direction. For example, the photographed image 410 may have 640 pixels in the horizontal direction and 480 pixels in the vertical direction.

In FIG. 6, in the person image 420, the centroid 430 of the person image 420 is not included in the pixel within the predetermined area near the center of the photographed image 410, and hence it is determined that the occurrence of the frame-out is predictable.

Figure 7:
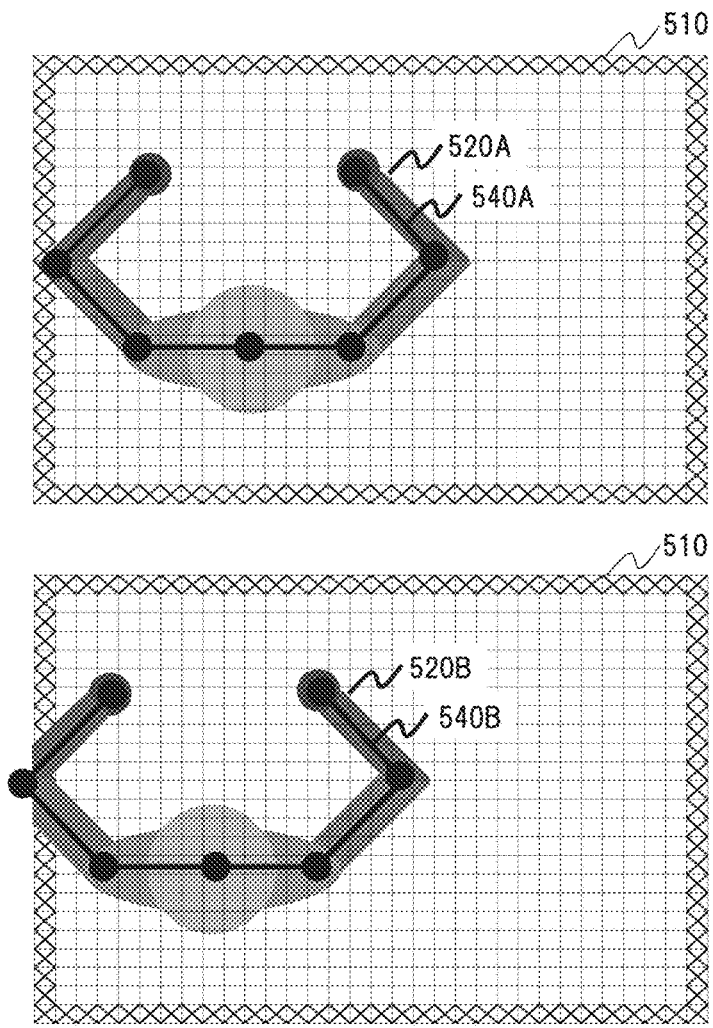
FIG. 7 is a diagram for illustrating an example of determining an occurrence of a frame-out of a person skeleton in the behavior analysis apparatus according to the first embodiment.

FIG. 7 is a diagram for illustrating an example of determining an occurrence of the frame-out of the person skeleton in the behavior analysis apparatus 100 according to the first embodiment. In the determination of the occurrence of the frame-out of the person skeleton in the behavior analysis apparatus 100 according to the first embodiment, as a processing content of the determination of the frame-out, the frame-out determination unit 114 determines that the frame-out has occurred when the person skeleton exists in a pixel of the outermost periphery of a photographed image 510. In this case, the notification unit 115 notifies the person of the direction of the frame-out, the fact that the frame-out has occurred, and the behavior for improvement based on a direction in which the pixel involved in the detection of the frame-out is arranged with respect to the picked-up image with the message "You have been framed out to the left, so move back to the normal position immediately."

In the example of FIG. 7, the photographed image 510 is obtained by arranging 32 pixels in the horizontal direction and 24 pixels in the vertical direction, each of the pixels being indicated by a square. A pixel indicated by the mark "x" represents a pixel that corresponds to the outermost periphery of the photographed image 510. Person images 520A and 520B are obtained by extracting the person image from the photographed image viewed from immediately above the person, and are assumed to have a color density that simulates a distance (depth) from the photographing position. Person skeletons 540A and 540B are information indicating shapes of skeletons by expressing person skeletons, which are estimated from the person images 520A and 520B, respectively, based on a predetermined algorithm, by edges (straight lines) each connecting joints and nodes (points) representing the joints. It is apparent that the number of pixels within the photographed image 510 is not limited to 32 pixels in the horizontal direction or 24 pixels in the vertical direction. For example, the photographed image 510 may have 640 pixels in the horizontal direction and 480 pixels in the vertical direction.

In FIG. 7, the person's left elbow, which is a part of the person skeleton, is included in the pixels of the outermost periphery within the photographed image 510, and hence it is determined that the person image exists in the pixels of the outermost periphery and that the frame-out has occurred.

FIG. 8 is a diagram for illustrating an example of determining whether or not the frame-out of the person skeleton is predictable in the behavior analysis apparatus 100 according to the first embodiment. In the determination as to whether or not the frame-out of the person skeleton is predictable in the behavior analysis apparatus 100 according to the first embodiment, as a processing content of the determination of the frame-out, the frame-out determination unit 114 determines that the frame-out is predictable when the person skeleton exists in a pixel spaced apart from the outermost periphery of a photographed image 610 by a predetermined distance. In this case, the notification unit 115 notifies the person of the direction of the frame-out, the prediction of the frame-out, and the behavior for improvement based on a direction in which the pixel involved in the detection of the predictable frame-out is arranged with respect to the picked-up image with the message "You will be framed out to the left, so be aware of the normal position."

In the example of FIG. 8, the photographed image 610 is obtained by arranging 32 pixels in the horizontal direction and 24 pixels in the vertical direction, each of the pixels being indicated by a square. A pixel indicated by the mark "x" represents the pixel that corresponds to the outermost periphery of the photographed image 610. A pixel indicated by the oblique line represents a pixel spaced apart from the outermost periphery of the photographed image 610 toward the inside by a predetermined distance. Person images 620A and 620B are obtained by extracting the person image from the photographed image viewed from immediately above the person, and are assumed to have a color density that simulates a distance (depth) from the photographing position. Person skeletons 640A and 640B are information indicating shapes of skeletons by expressing person skeletons, which are estimated from the person images 620A and 620B, respectively, based on the predetermined algorithm, by edges (straight lines) each connecting joints and nodes (points) representing the joints. It is apparent that the number of pixels within the photographed image 610 is not limited to 32 pixels in the horizontal direction or 24 pixels in the vertical direction. For example, the photographed image 610 may have 640 pixels in the horizontal direction and 480 pixels in the vertical direction.

In FIG. 8, the person's left elbow is included in the pixels spaced apart from the outermost periphery toward the inside by the predetermined distance within both the person image 620A and the person image 620B, and hence it is determined that the person skeleton exists in the pixel spaced apart from the outermost periphery toward the inside by the predetermined distance and that the occurrence of the frame-out is predictable.

FIG. 9 is a diagram for illustrating another example of determining whether or not the frame-out of the person skeleton is predictable in the behavior analysis apparatus 100 according to the first embodiment. In the another example of determining whether or not the frame-out of the person image is predictable in the behavior analysis apparatus 100 according to the first embodiment, as a processing content of the determination of the frame-out, the frame-out determination unit 114 determines that the frame-out is predictable when a centroid 750 of the person skeleton does not exist in pixels within a predetermined area near the center of a photographed image 710 (for example, within a rectangular shape having 8 pixels in the horizontal direction and 6 pixels in the vertical direction with a center pixel of the photographed image 710 being used as the center). In this case, the notification unit 115 notifies the person of the direction of the frame-out, the prediction of the frame-out, and the behavior for improvement based on the direction in which the pixel involved in the detection of the predictable frame-out is arranged with respect to the picked-up image with the message "You will be framed out to the left, so be aware of the normal position."

In the example of FIG. 9, the photographed image 710 is obtained by arranging 32 pixels in the horizontal direction and 24 pixels in the vertical direction, each of the pixels being indicated by a square. A pixel indicated by the mark "x" represents a pixel that corresponds to the outermost periphery of the photographed image 710. A pixel indicated by the oblique line represents a pixel existing in the predetermined area near the center of the photographed image 710. A person image 720 is obtained by extracting the person image from the photographed image viewed from immediately above the person, and is assumed to have a color density that simulates a distance (depth) from the photographing position. A person skeleton 740 is information indicating a shape of a skeleton by expressing a person skeleton, which is estimated from the person image 720 based on the predetermined algorithm, by edges (straight lines) each connecting joints and nodes (points) representing the joints. It is apparent that the number of pixels within the photographed image 710 is not limited to 32 pixels in the horizontal direction or 24 pixels in the vertical direction. For example, the photographed image 710 may have 640 pixels in the horizontal direction and 480 pixels in the vertical direction.

In the example of FIG. 9, the centroid 750 of the person skeleton 740 is not included in the pixel within the predetermined area near the center of the photographed image 710, and hence it is determined that the occurrence of the frame-out is predictable.

Examples of technical effects produced by the behavior analysis apparatus 100 according to this embodiment are as follows, but the present invention is not limited thereto, and it should be understood that the effects that are easily expected to be produced by the technical features can also be produced. First, a target person can be notified of the predicted occurrence of the frame-out of the person toward the outside of the camera field angle in advance, which can prevent the occurrence of the frame-out of the person. Further, the target person can also be immediately notified of the occurrence of the frame-out, which can suppress the occurrence of the frame-out to a minimum. With this configuration, it is possible to improve the performance of person skeleton detection and person behavior analysis.

The behavior analysis apparatus 100 according to this embodiment has been described above specifically, but the present invention is not limited to the above-mentioned embodiment, and it should be understood that various changes can be made within the scope that does not depart from the gist of the invention. For example, as a condition for determining the occurrence of the frame-out, it may be determined that the frame-out has occurred when the photographed image does not include a part or all of the person skeleton including the person's head, arm, and hand, which are regarded as important for the person behavior analysis. In that case, the frame-out determination unit 114 recognizes a body part of a human body with respect to the person skeleton or the person image, determines a recognition range of the head, the arm, the hand, or the like, and determines that the frame-out has occurred when a part or all of each of the body parts has disappeared from the photographed image along a time series. With such a configuration, it is possible to issue a warning only when it is highly probable that image information required for the person behavior analysis cannot be obtained, which reduces an unnecessary warning for the worker and can alleviate stress to be imposed on the worker.

Further, for example, the frame-out determination unit 114 described above is configured to determine that the occurrence of the frame-out is predictable when a centroid of the person image or a centroid of the person skeleton is not included in the pixel within the predetermined area near the center of the photographed image, but the present invention is not limited thereto, and it may be determined that the occurrence of the frame-out is predictable when a center position of the person image or a center position of the person skeleton (that is, center position set to the middle point of diagonal lines of a rectangular region including the person image or the person skeleton) is not included in the pixel within the predetermined area near the center of the photographed image. With this configuration, it is possible to reduce a load on the behavior analysis apparatus 100 in terms of the arithmetic operation, to thereby enhance parallel processing performance.

Further, for example, the frame-out determination unit 114 and the notification unit 115 that are described above are configured to identify the direction of the frame-out and to issue a notification, but the present invention is not limited thereto, and the frame-out determination unit 114 and the notification unit 115 may be configured to issue the notification without identifying the direction. With this configuration, it is possible to reduce the load on the behavior analysis apparatus 100 in terms of the arithmetic operation to enhance the parallel processing performance.

Further, for example, in the above-mentioned embodiment, the output apparatus 2 is assumed to be a display, but may be, as its example, a device configured to issue the notification so as to be superimposed on the real-world view by augmented reality (AR) through use of a display that covers a part or all of a wearer's vision and is also translucent in order to ensure the wearer's vision to some extent. In that case, a vector and the like for intuitively indicating a moving direction and a moving amount for recovery from the frame-out may be displayed so as to be superimposed on an image obtained by the image pickup apparatus 1. With this configuration, it is possible to provide the worker with more detailed guidelines.

Further, for example, in the above-mentioned embodiment, the image pickup apparatus 1 has the field angle of the camera directed vertically downward from above the head of the worker, but the present invention is not limited thereto, and the field angle of the camera may be directed, for example, diagonally downward from the upper left or right of the worker or toward the horizontal direction from the left or right of the worker. With this configuration, when the depth from the worker is shorter than a predetermined distance or longer than the predetermined distance, the worker can be informed of a moving amount calculated from the depth information so as to maintain an appropriate distance between the worker and the camera, and hence it is possible to reduce the load on the behavior analysis apparatus 100 in terms of the arithmetic operation, to thereby enhance the parallel processing performance.

In the above-mentioned embodiment, the configurations are described in detail in order to clearly describe the present invention, but the present invention is not necessarily limited to an embodiment that includes all the configurations that have been described.

Further, in regard to each of the above-mentioned configurations, functions, processing units, and the like, a part thereof or an entirety thereof may be implemented by hardware, for example, by being designed as an integrated circuit. Further, control lines and information lines that are assumed to be necessary for the sake of description are illustrated, but not all the control lines and the information lines on a product are illustrated. In actuality, it may be considered that almost all the components are connected to one another.

Further, the above-mentioned configurations, functions, processing units, and the like may be implemented as a distributed system by, for example, executing a part or all of the configurations, functions, processing units, and the like by another apparatus and integrating the execution results via a network.

Further, technical elements of the above-mentioned embodiment may be applied alone, or may be applied by being divided into a plurality of portions such as program parts and hardware parts.

The embodiment of the present invention has been mainly described above.

REFERENCE SIGNS LIST

1 . . . image pickup apparatus, 2 . . . output apparatus, 110 . . . control unit, 111 . . . image acquisition unit, 112 . . . person image extraction unit, 113 . . . person skeleton detection unit, 114 . . . frame-out determination unit, 115 . . . notification unit, 116 . . . person behavior analysis unit, 120 . . . storage unit, 121 . . . video storage unit, 130 . . . communication unit, 140 . . . output control unit

What is claimed is:

1. A behavior analysis apparatus, comprising:
a processor connected to memory;
a storage device connected to the processor; and
a communication device connected to the processor, wherein the memory stores instructions that when executed by the processor configure the processor to:
acquire a photographed image including a person with a predetermined field angle and having a plurality of pixels with a depth for each pixel;
extract an area in which the person being a moving subject exists from the photographed image as a person image area;
detect a person skeleton representing a posture of the person from the person image area;
determine that a frame-out of the person toward an outside of the predetermined field angle is predicted when a centroid of the person skeleton in the photographed image is outside a predetermined central area in the photographed image; and
notify the person of the determination that the frame-out is predicted,
wherein the processor is further configured to obtain the photographed image from at least one range camera,
wherein the depth for each pixel represents a distance from a photographing position from the at least one range camera, and
wherein the processor is further configured to:
when the depth is shorter than a predetermined first distance or longer than a predetermined second distance, notify the person of a moving amount to maintain a predetermined distance from the at least one range camera.

2. A behavior analysis apparatus according to claim 1, wherein the processor is further configured to:
determine that the frame-out has occurred when a part of the person image area exists in an outermost periphery of the photographed image; and
notify the person of the determination that the frame-out has occurred.

3. A behavior analysis apparatus according to claim 1, wherein the processor is further configured to determine that the frame-out is predicted when the person skeleton does not exist in an outermost periphery of the photographed image and the centroid of the person skeleton exists in an area spaced apart from the outermost periphery of the photographed image and is outside the predetermined area in the photographed image.

4. A behavior analysis apparatus according to claim 1, wherein the predetermined area is comprised of a first number of pixels in a horizontal direction and a second number of pixels in a vertical direction and the predetermined area includes a center of the photographed image.

5. A behavior analysis apparatus according to claim 1, wherein the processor is further configured to:
determine that the frame-out has occurred when a part of the person skeleton exists in an outermost periphery of the photographed image; and
notify the person of the determination that the frame-out has occurred.

6. A behavior analysis apparatus according to claim 1, wherein the processor is further configured to determine that the frame-out is predicted when the person skeleton does not exist in an outermost periphery of the photographed image and the centroid of the person skeleton exists in an area spaced apart from the outermost periphery of the photographed image predicted.

7. A behavior analysis apparatus according to claim 1, wherein the predetermined area is set at a center of the photographed image.

8. A behavior analysis apparatus according to claim 1, wherein the processor is further configured to determine that the frame-out has occurred when the centroid of the person skeleton does not exist within the photographed image.

9. A behavior analysis apparatus according to claim 1, wherein the processor is further configured to:
detect a direction of the frame-out of the person toward the outside of the predetermined field angle; and
upon determining that the frame-out is predicted, notify the person of the direction of the predicted frame-out.

10. A behavior analysis method for a behavior analysis apparatus comprising a processor connected to memory, a storage device connected to the processor, and a communication device connected to the processor, wherein the memory stores instructions that when executed by the processor causes the processor to perform the steps of:
acquiring a photographed image including a person with a predetermined field angle and having a plurality of pixels with a depth for each pixel;
extracting an area in which the person being a moving subject exists from the photographed image as a person image area;
detecting a person skeleton representing a posture of the person from the person image area;
determining that a frame-out of the person toward an outside of the predetermined field angle is predicted when a centroid of the person skeleton in the photographed image is outside a predetermined central area in the photographed image;
notifying the person of the determination that the frame-out is predicted,
wherein the processor further performs the step of acquiring the photographed image from at least one range camera, and the depth for each pixel represents a distance from a photographing position from the at least one range camera; and
when the depth is shorter than a predetermined first distance or longer than a predetermined second distance, notifying the person of a moving amount to maintain a predetermined distance from the at least one range camera.

11. A behavior analysis method according to claim 10, wherein the processor further performs the steps of:
- determining that the frame-out has occurred when a part of the person image area exists in an outermost periphery of the photographed image; and
- notifying the person of the determination that the frame-out has occurred.

12. A behavior analysis method according to claim 10, wherein the processor further performs the step of determining that the frame-out is predicted when the person skeleton does not exist in an outermost periphery of the photographed image and the centroid of the person skeleton exists in an area spaced apart from the outermost periphery of the photographed image and is outside of the predetermined area in the photographed image.

13. A behavior analysis method according to claim 10, wherein the predetermined area is comprised of a first number of pixels in a horizontal direction and a second number of pixels in a vertical direction and the predetermined area includes a center of the photographed image.

14. A behavior analysis method according to claim 10, wherein the processor further performs the steps of:
- determining that the frame-out has occurred when a part of the person skeleton exists in an outermost periphery of the photographed image; and
- notifying the person of the determination that the frame-out has occurred.

15. A behavior analysis method according to claim 10, wherein the processor further performs the step of determining that the frame-out is predicted when the person skeleton does not exist in an outermost periphery of the photographed image and the centroid of the person skeleton exists in an area spaced apart from the outermost periphery of the photographed image and is outside the predetermined area in the photographed area.

16. A behavior analysis method according to claim 10, wherein the predetermined is set at a center of the photographed image.

17. A behavior analysis method according to claim 10, wherein the processor further performs the step of determining that the frame-out has occurred when the centroid of the person skeleton does not exist within the photographed image.

18. A behavior analysis method according to claim 10, wherein the processor further performs the steps of:
- detecting a direction of the frame-out of the person toward the outside of the predetermined field angle; and
- upon determining that the frame-out is predicted, notifying the person of the direction of the predicted frame-out.

* * * * *